United States Patent [19]
Johnson

[11] Patent Number: 5,201,609
[45] Date of Patent: Apr. 13, 1993

[54] CELLULAR LANDFILL PROCESS AND APPARATUS

[75] Inventor: Paul H. Johnson, McIntosh, N. Mex.

[73] Assignee: Johnson Research and Development Corp., McIntosh, N. Mex.

[21] Appl. No.: 734,796

[22] Filed: Jul. 23, 1991

[51] Int. Cl.$^5$ .............................................. B09B 1/00
[52] U.S. Cl. ..................................... 405/129; 405/36; 405/270
[58] Field of Search .................... 405/36, 50, 128, 129, 405/258, 270; 588/249, 259

[56] References Cited

U.S. PATENT DOCUMENTS

| | | | |
|---|---|---|---|
| 3,586,624 | 6/1971 | Larson | 210/3 |
| 3,705,851 | 12/1972 | Brauer | 405/129 X |
| 4,323,367 | 4/1982 | Ghosh | 48/197 A |
| 4,464,081 | 8/1984 | Hillier et al. | 405/128 |
| 4,469,176 | 9/1984 | Zison et al. | 166/250 |
| 4,516,615 | 7/1985 | Johnson | 75/101 R |
| 4,518,399 | 5/1985 | Croskell et al. | 55/16 |
| 4,541,752 | 9/1985 | Phillips | 405/129 |
| 4,909,667 | 3/1990 | DeMello | 405/128 |
| 4,973,196 | 11/1990 | Fuhr et al. | 405/129 |

OTHER PUBLICATIONS

"Environmental Engineering" *Proceedings of the 1987 Specialty Conference* Orlando, Florida, Jul. 6-8, 1987.
Chapter 10 of Text *Solid Wastes: Engineering Principles and Management Issues* pp. 315-374, McGraw-Hill 1977; author G. Tchobanoglous.
"Landfills are #1", article appearing in *Garbage*, Sep.-/Oct. 1990 issue, pp. 42-46.
"Above Grade Storage of Waste" by K. W. Brown and David C. Anderson *Disposl & Storage*, pp. 265-268.
*Waste Management of New Mexico* by William Terry pp. 14-25 Company report.
"Evolution of Practical on Site Above Ground Closures" by L. Graybill *Nat'l Conf on Management of Uncontrolled Hazardous Waste Sites*, Oct. 31-Nov. 2, 1983; Wash. D.C.
News article, *The Buffalo News* "Advanced Waste Facility Planned by CECOS", May 12, 1985.
Textbook "Handbook of Solid Waste Disposal, Materials and Energy Recovery" by J. Pavoni, Van Nostrand Reinhold Co, publisher; 1975; pp. 232-249.
*Sanitary Landfill*, Chapter 4 of textbook "Handbook of Solid Waste Disposal" by J. Pavoni, Van Nostrand Reinhold Co. publ; 1975; pp. 169-124.

*Primary Examiner*—David H. Corbin
*Attorney, Agent, or Firm*—Deborah A. Peacock; Rod D. Baker; Donovan F. Duggan

[57] ABSTRACT

The present invention is directed to a process and apparatus wherein municipal refuse, and many other types of solid waste, are disposed of in a landfill repository that maintains them in a dry state indefinitely. This eliminates most environmental and many cost problems. The principal design feature of this landfill is its cellular internal structure, which has rows of contiguous, rectangular water- and gas-tight cells that are built on top of one another to form a high, multi-layered structure. These cells are simultaneously constructed and filled with solid waste in a series of short, incremental wall berm construction and filling steps on a one-cell-at-a-time basis in the top layer of the landfill. The sides of the structure and the tops of the cells in the top layer are continuously protected from rain infiltration by impervious covers, and uncontaminated rain waters, leachates, leakage, and gases are separately withdrawn from the system on a cell-by-cell basis by an internal plumbing and monitoring system. Biodegradation is used in cells in the top layer to produce methane gas.

65 Claims, 6 Drawing Sheets

FIG — 10

CELLULAR LANDFILL PROCESS AND APPARATUS

BACKGROUND OF THE INVENTION

1. Field of the Invention (Technical Field)

The present invention is generally related to landfill design, construction and operation. More particularly, the present invention is directed to the long-term environmental disposal and treatment of municipal refuse and other types of solid waste by improved processes and landfill design.

2. Background Art

Landfills consist of two basic types. In the "below-ground" mode municipal refuse is placed in a depression in the ground, and in the "above-ground" mode a heap is formed on top of the ground. In each case, refuse is built up within the landfill as a series of approximately ten-foot thick, horizontal layers. As refuse is added to the advancing, inclined face of the top layer, it is compacted with heavy equipment. A daily earthen cover that is approximately one foot thick is placed over the newly-formed area to reduce insect infestation and odor emissions.

In the past, these landfills were not lined at their bottoms. Rain and snowmelt waters would percolate downward through them, biodegradation would occur, and the contaminated leachates that would be formed would seep into the underlying groundwaters. These environmental pollution problems have caused about two-thirds of the landfills in the United States to close down in recent years.

New, much stricter, revisions to the EPA landfill regulations will soon require that landfills have (1) a 30-year post-closure maintenance period, (2) bottom liners and a leachate collection system, and (3) means to detect and prevent the disposal of regulated hazardous wastes and PCB's. These new requirements have caused landfill costs to increase dramatically in recent years.

More modern landfills have their bottoms lined with clay and/or synthetic linings and, after they are completely filled, are capped with layers of clay, synthetic linings, sand, and/or fertile soil. Leakage has been a problem with both these bottom linings and these cap layers. In some cases, differential settling of the landfill has caused the cap layers to rupture. There is a considerable amount of liability associated with these landfills.

The basic problem with these modern landfills is one of leachate control. In the thirty, or more, years that it often takes to build a landfill, rain or snowmelt waters infiltrate its exterior surfaces, react with the refuse, and generate contaminated leachates and methane, carbon dioxide, hydrogen sulfide, and other gases that can pollute both the atmosphere and underground waters. These leachates, which either drain out the bottom of an above-ground landfill or are pumped out of the bottom of a below-ground landfill, must be stored in external reservoirs and/or treated in leachate treatment facilities. In the case of the above-ground landfill, these reservoirs must be large enough to store the landfill's effluent leachates after large rainstorms. The operation of these facilities for up to sixty years constitutes a tremendous operating expense.

One solution that has been used is to minimize rain infiltration by building relatively small (about 24 acres each) and thin (between twenty and thirty feet in thickness) above-ground landfills on a one-at-a-time basis and cover them after they are filled. While this design minimizes leachate generation and gas production, it nevertheless requires relatively large land areas, large amounts of natural building materials (dirt, sand, clay, etc.) and the long-term production of leachates over a large area is still a problem.

Prior to the present invention, no one has developed a landfill design wherein a tall landfill is build with a minimum base area and top cover, a heavy, impermeable cover is built over the entire landfill simultaneously with the construction and filling operations, and the refuse contents are kept in a "dry" state indefinitely. The present invention is designed to accomplish these objectives.

Very heavily built vaults are sometimes used in the prior art to encapsulate hazardous wastes. While they may maintain these wastes in a dry state for very long periods of time, they are much too expensive to be used as repositories for solid wastes that have relatively low levels of contamination.

Over the past twenty years there has been considerable testwork done on a process wherein municipal refuse is contained in a cell with impermeable sides and a dirt-covered top and wetted with recirculated leachates to effect biodegradation to the point where the refuse is environmentally inert. These cells are usually single, lined trenches with a leachate collection zone at their base. They are expensive to build and operate and, because of their depths (twenty to thirty feet), may require excessively long biodegradation periods. Their gas production is poorly contained and recovered, and the long-term environmental security of the process is questionable.

A process and apparatus that is used in the heap leaching of metallic ores has some of the basic design features that are needed to build a tall landfill that could prevent rain infiltration. This process and apparatus, which is described in U.S. Pat. No. 4,526,615, entitled Cellular Heap Leach Process and Apparatus, to Johnson, discloses a heap that is formed by laying layer upon layer of crushed ore on top of impervious interlayers and forming small dirt berms on the tops and bottoms of these ore layers to define individual cells. Leaching solutions are recirculated through these cells to effect leaching of metallic values from crushed ores. This system is not impervious to rain infiltration from the outside, and leachates can move to some degree between cells.

From the foregoing, it will be appreciated that the present invention is a significant advancement in the area of solid waste disposal. The solid waste landfill or repository of the present invention is built and operated so that the contained municipal refuse, or other solid wastes, are maintained in a dry state while the system is being constructed and filled and indefinitely thereafter. In such a system, no leachates are ever generated, and most of the small amount of gases that are formed are separately withdrawn from the system. Also, without biodegradation, differential landfill settling is minimal. Moreover, this landfill has additional significant advancements in that: (1) it has comparatively low capital, operating, and environmental costs; (2) it requires a relatively small area of land on which to build it; (3) it requires relatively small amounts of sand, dirt, clay, etc.; (4) it has aesthetic qualities that make landfills more acceptable to the public; (5) it makes use of several new, more efficient refuse inspection, filling, wet compaction, and daily covering processes; (6) the exterior cover is monitorable on a cell-by-cell basis for leakage and is repairable; (7) when the landfill reaches a tall height it can be used as a hillside site for recreation and sports (e.g., skiing, sledding, climbing, etc.) and, when closed, its top area can be used as view property; (8) it can be advantageously used on many types of solid wastes and some liquid wastes in either small or large facility sizes and in most geographic locations; and (9) it can be used to generate large volumes of valuable methane gas.

These and other objects of the present invention will become more fully apparent in view of the following detailed description, the accompanying drawings, and the appended claims.

SUMMARY OF THE INVENTION (DISCLOSURE OF THE INVENTION)

The present invention is directed to improved landfill design, construction, and operation which provide improved environmental security, low costs, methane gas production, aesthetic qualities, and the ability to be used on many different types of solid and absorbed liquid wastes in almost all climates.

The most important attribute of the present invention is that the solid waste fill is maintained in a dry state indefinitely by the continuous covering process and the cellular structure. This eliminates virtually all of the problems that are associated with leachate generation in the present technologies (e.g., the construction of expensive, small, thin, covered landfills; the construction and operation of leachate storage and treatment facilities; the liability associated with bottom leakage; the emission of gases to the atmosphere and differential landfill settling that result from unwanted biodegradation; adverse public opinion that affects siting and permitting; and high capital, operating, and environmental costs, and the like). It also makes it possible to store many other types of wastes in the system.

Another feature of the present invention is that a relatively tall (several hundred feet high in medium- and large-sized landfills) landfill is built that has a relatively small base area. This reduces the size of the site area, the size of the area that needs to be covered, and the amount of rain that will fall on the system and need to be removed. These factors in turn reduce costs.

Yet another feature of the present invention is the fact that it can be built on an individual, or one-cell-at-a-time basis. This restricts the amount of rain that may infiltrate the system during loading, and reduces capital costs.

Other important features of the present invention, that may be categorized as being aesthetic in nature, are the covering of new refuse piles with netting to reduce the bird and wind-blown paper problems, the identification and removal of hazardous wastes, superficial wetting of new refuse in the filling step to increase its compaction and reduce wind-blown paper problems, covering of inactive areas of a cell that is being loaded with an impermeable cover to prevent gas emissions and rain infiltration and the nightly covering of the active areas with the same type of cover, the minimal usage of land area and natural building materials, the peace of mind that is afforded by the system's environmental security, and its appearance as a grass- and sand-covered mound, its eventual use as a summer and winter site for sports, and the like. These features reduce environmental problems, facilitate operations, and reduce public opposition to landfills, thereby reducing permitting and siting problems.

Another feature of the present invention is that it may be used to produce large quantities of valuable methane gas from municipal refuse. The income from the sale of this gas may significantly reduce the overall landfill costs.

Still another important feature of the present invention is its use as a dry repository for many types of solid and liquid wastes. These include mineral and soil types of solid wastes (e.g., old and newly-milled ore tailings, industrial compounds, chemically- or radioactively-contaminated mineral or soil materials, beach sands or gravels that are contaminated by petroleum spills, or the like); wastes that can be mixed in with municipal refuse or other dry materials such as dirt, tailings, or absorbent materials such as vermiculite (e.g., liquid wastes, manure, septic tank pumpings, sewage sludge, petroleum products, soluble chemical salts, and the like); encapsulated medical wastes; low-level nuclear wastes and asbestos; and the like. It is preferable to dispose of some of these materials deep within the cells near the center of the landfill and near the tops of cells to provide environmental security. If some of these materials are disposed of by mixing with municipal refuse, it is advisable to not biodegrade them to recover methane, as there may be a chance of them ending up in a small amount of effluent leachate. On the other hand, materials such as sewage and the like can contribute to methane production.

Many of the existing landfills today are leaking pollutants into groundwaters and gases into the atmosphere, and require, or will require, remedial action. If the exterior sides of these landfills are covered with a cover similar to the exterior side cover of the present invention and a cellular landfill is constructed on the top horizontal surfaces, then most of the environmental qualities of the present invention can be imparted to the entire landfill, affording added capacity.

A primary object of the present invention is to provide a landfill with a very high degree of environmental security when used as a repository for many types of solid and absorbed liquid wastes.

A secondary object of the present invention is to provide a landfill that has low costs, thereby making it economical to use in small and large facility sizes and in most locations.

Another object of the present invention is to provide a landfill that has many aesthetic features, thereby making it acceptable to the landfill owners, the government permitting agencies, and the public.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DESCRIPTION OF THE PREFERRED EMBODIMENTS (BEST MODES FOR CARRYING OUT THE INVENTION)

The landfill construction of the invention comprises a multiplicity of independent water- and gas-tight cells, each of which may be separately constructed and filled with municipal refuse or other solid wastes and then covered with the impervious bottom of an overlying cell to prevent rain infiltration, yet which are constructed on a single pad and may even be contiguous to one other. Thus a plurality of filled cells is formed by simultaneously constructing impervious cell berm walls and filling their interiors with solid wastes. These interior and exterior cell walls and the access road at one end of each cell serve to separate the surface of the pad into a network or plurality of individual solid waste containment cells. A relatively tall landfill is constructed by placing one layer of these cells upon another until the top surface area becomes too small to economically continue operations.

Maintaining the solid waste fill in a dry state virtually forever is accomplished within the present invention by an integrated, impervious, multi-layered exterior cover and rain drainage system and numerous internal impervious linings and leakage removal layers. At any time in its history, rain that falls on this cellular landfill's sides must avoid being evaporated or consumed within the top porous soil vegetation layer or withdrawn by an imbedded drainage system, penetrate a thick (40 mil) impervious synthetic lining, and then penetrate approximately five feet of impenetrable clay before it comes into contact with the solid waste fill. Even then, leakage can only migrate through a few feet of waste before it is withdrawn from the system via the leakage drainage system. A similar multi-layered cover is used on top of the landfill when it was completely filled. While it is being filled, the entire top surface of the cellular landfill is protected from rain infiltration by permanent or temporary impervious synthetic linings and individual cell rain drainage systems. Wastes that lie deep within the system are further protected by numerous overlying impervious linings and their leakage drainage layers. The entire system is continuously monitored for leakage on a cell-by-cell basis by its water- and gas-tight cellular structure and its internal plumbing system.

An impermeable and erosion-resistant cover is constructed on the sides of the landfill simultaneous with cell construction by utilizing the thick exterior clay cell walls as an impermeable base for this cover. This layer is then covered with an impervious lining material, an overlying rain drainage system, and a top porous soil cover. An internal plumbing system separately removes and disposes of rain and snowmelt waters from the covered top cells of the system, separately collects and recovers any excess solutions or leakage waters that may get into the system on a cell-by-cell basis, separately collects and recovers virtually all of the gases that are generated within the covered cells, and provides monitoring for each cell for leakage and gas production.

The cellular landfill operating process of the invention comprises: loading, inspection, hazardous waste removal, pest abatement, temporary covering, filling, and wet compaction processes; a wall construction process; a process for dewatering slurried solid wastes; the drainage and disposal of wet solid wastes; the disposal of soluble salts, liquid wastes, and products such as manure, septic tank pumpings, sewage, and the like, by mixing them in with solids or solid wastes; accelerated biodegradation within the top cells of the system that produces methane but does not require leachate recirculation; and cell-by-cell monitoring.

Figure 1:
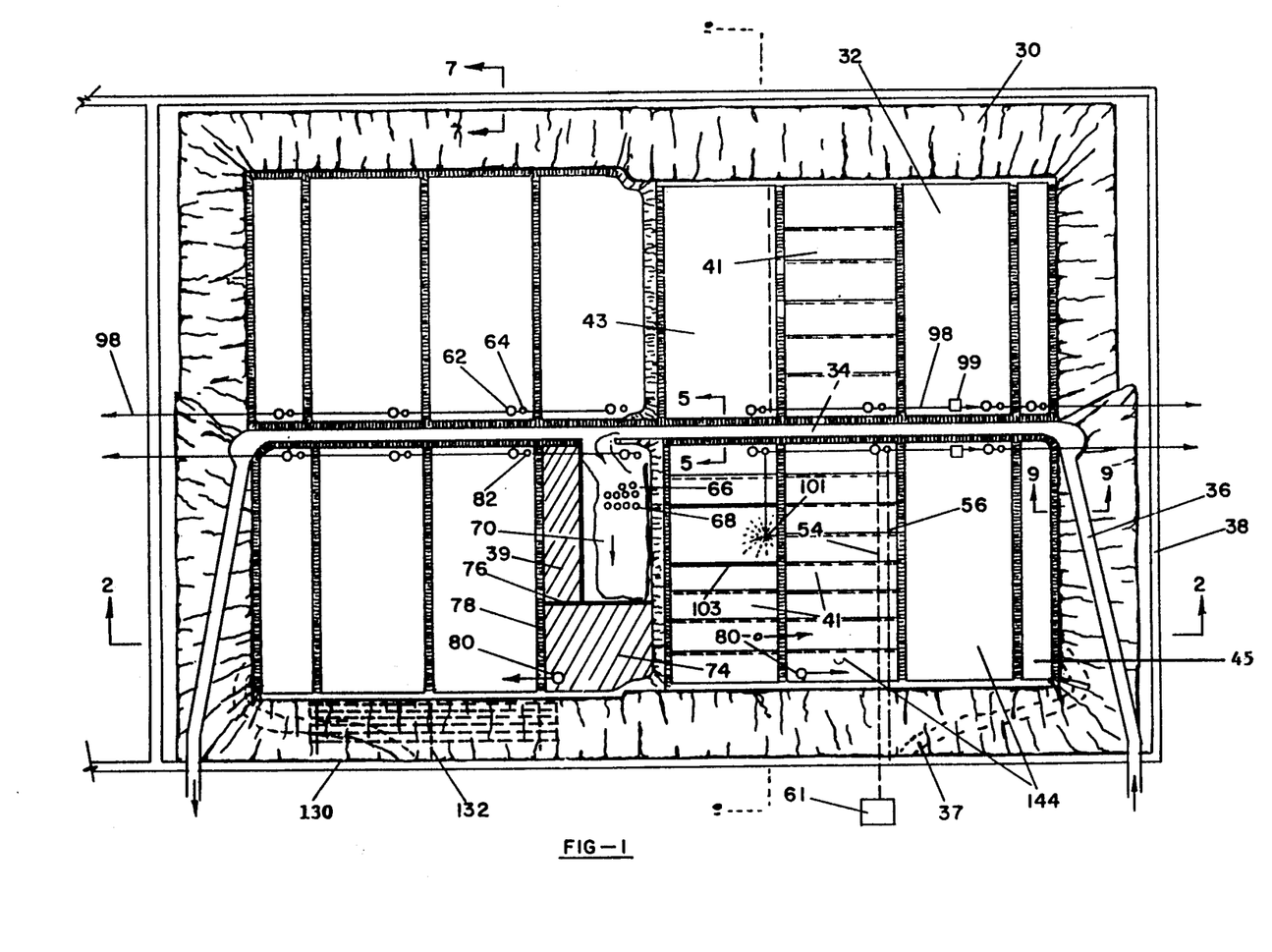
FIG. 1 is a top plan view of the preferred typical cellular landfill installation of the present invention.
Figure 2:
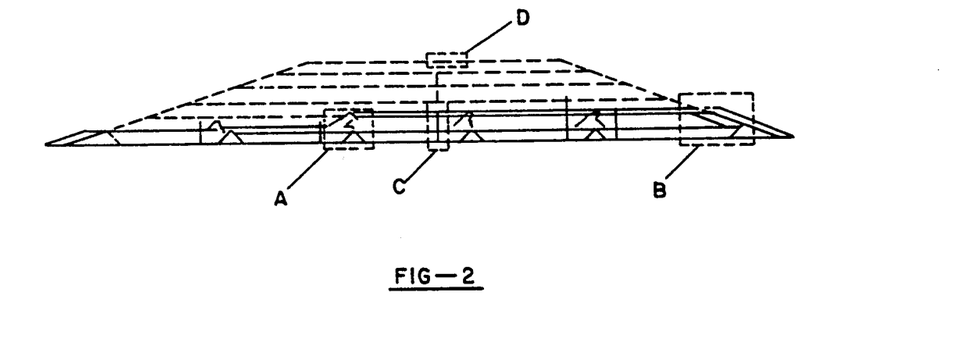
FIG. 2 is a vertical cross-section view of the FIG. 1 embodiment, as taken along line 2—2 of FIG. 1.

The present invention may best be understood by reference to the drawings which illustrate the preferred embodiment of the invention, wherein like elements are represented by like numerals. As shown therein, FIGS. 1 and 2 illustrate a typical landfill installation 30 constructed and operated in accordance with the present invention. Installation 30 includes a number of individual, above-ground landfills or cells 32 aggregated together so as to form a large above-ground landfill. A central one way access road 34 and end ramps 36 provide access to the cellular structure, and concrete rain water channels 38 lie on all four sides of the structure.

In the illustration of FIG. 1, one cell 39 is shown being filled with solid waste (municipal refuse is shown); eleven cells are covered with permanent covers to prevent rain and snowmelt infiltration; three cells are covered with a temporary covering 41; and one cell 43 is temporarily exposed to effect biodegradation using rain infiltration. As best seen in FIG. 2, various cells are also built on top of existing cells in the course of building the over-all system.

The construction design features and operational steps of the present invention may be categorized as follows: the base layer 40; the bottom layer walls; the central access road; the internal plumbing systems; the cell bottom drainage layers; refuse or solid waste filling steps; covering cells with bottom drainage layers; overlying cell walls; the exterior side rain drainage system and cover; and the closure cover. The system will henceforth be described in this order.

Although the system is designed to be operated dry, and the bottom lining may never be wetted, environmental concerns and state and federal laws may dictate that it have a heavy, impervious bottom layer to prevent contaminated leachates from seeping into underlying groundwater. One preferred embodiment of such a bottom is illustrated in FIGS. 3-7. The original base soil layer 40 is leveled and compacted for an area slightly larger than the first cell 45. An impervious clay layer 42, that is preferably between eight and twenty-four inches in thickness, is next formed on top of base layer 40 and then compacted and leveled. An impervious base lining 44 (such as a 40 mil thickness of polyvinyl chloride, chlorinated polyethylene, high-density polyethylene sheet material, or other suitable material) is then advantageously placed over the compacted impervious base layer 40.

Working from the exterior of the cell, where there is no impervious lining 44, the bottom-layer triangular interior berms 46 are constructed with compacted dirt fill, the bottom-layer triangular exterior berms 48 are constructed with compacted dirt on the interior sides, and impervious clay (or other highly impermeable natural building material, such as a bentonite-dirt mixture) on their exterior sides, and the back end of this cell is formed by building a trapezoidal-shaped compacted dirt berm 50 across it. Berm 50 also forms the center access road 34.

A coarse, porous sand layer 52, that is preferably between six and eighteen inches in thickness, is then formed in the bottom of the reservoir that is defined by the walls of berms 46,48,50. This layer is intended to act as a protective cover to the lining 44 and provide a conduit for any rain that may leak into the cell or gases that may be generated and not easily percolate through the solid waste bed.

Figure 6:
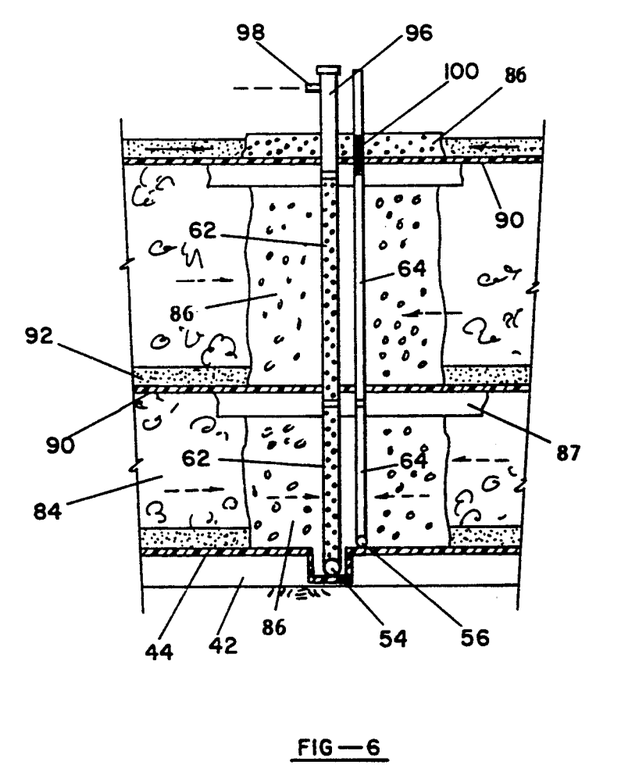
FIG. 6 is an enlarged vertical cross-sectional view of the FIG. 1 embodiment of the plumbing system in each cell column taken along line C of FIG. 2.
Figure 7:
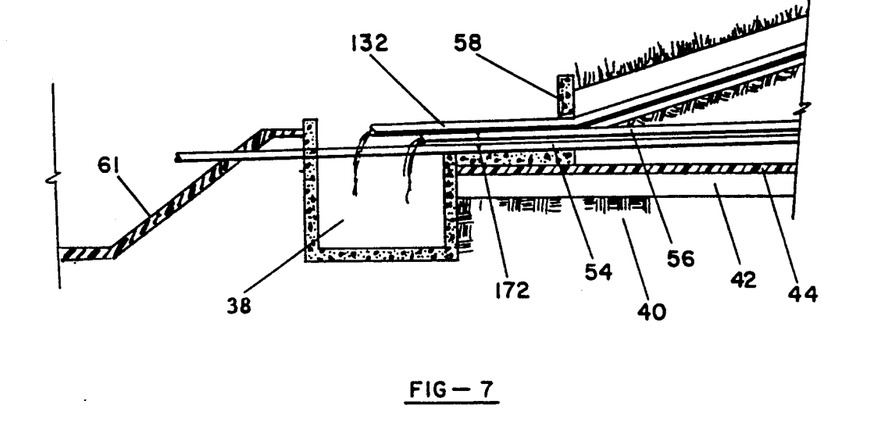
FIG. 7 is an enlarged vertical cross-sectional view of the FIG. 1 embodiment of a water drainage ditch and piping at the base taken along line 7—7 of FIG. 1.

The cell's internal plumbing system is then installed by laying non-perforated pipes 54,56 (see FIGS. 1 and 7) on top of liner 44 from the back end of the cell through the front exterior berm 48, through a valve box 58, and into the exterior rain drainage channel 38 (see FIG. 7). Pipe 54 terminates in a small leakage reservoir 61. A twelve foot (approximately) section of each of the large perforated and small vertical standpipes, 62 and 64 respectively (see FIG. 6), are then attached to connecting pipes 54,56.

This initial bottom cell 45 may be loaded with municipal refuse or other solid wastes. In this bottom cell, as in all other cells, the preferred loading steps consist of the following when the fill is municipal refuse: (1) the refuse is delivered in trucks to a select area 66 (see FIGS. 1 and 3) on the top of the cell that is being filled and dumped into separate tagged (if it is necessary to check for and remove hazardous wastes) piles 68, that are arranged in rows that have enough distance between them to allow a bulldozer to get between them; (2) if the refuse is to remain in these piles very long, they are then temporarily covered with a string netting (similar to fishnet) to reduce the bird and wind-blown paper problems; (3) the refuse is next bulldozed and, if necessary, simultaneously inspected and removed of illegal hazardous waste inclusions, on a pile-by-pile basis, onto the area 70 adjacent to the piles 68 in thin layers of approximately six to twelve inches in thickness: an exception to this would be the bottom layer of refuse 72 that would rest against sand layer 52, which would need to be thicker (approximately eighteen to twenty-four inches in thickness) to protect lining 44 from the effects of running heavy equipment on top of this layer; (4) refuse compaction would be achieved by running the bulldozer over the thin layers as it bulldozes on new material, thereby compacting it (some water could be added to repress dust and wind-blown papers and/or to aid in compaction) in separate steps (bulldozing would best be done at times when the wind is not blowing at high speeds); (5) when refuse is not being bulldozed onto an exposed area, it is covered with a heavy, impervious lining 74 (such as a 40 mil thickness of chlorinated polyethylene, high density polyethylene sheeting, or other suitable material) to prevent wind blowage of the cover and underlying paper, reduce insect infestation, limit rain water infiltration, and reduce gas emissions to the atmosphere., (6) inactive areas on the top of the partially filled cell have refuse PVC pipe section berms 76 (approximately twelve inches high) built around them and covered with a lining such as 74 until it is time to again bulldoze refuse over this particular area; (7) if rain is to collect in the reservoirs formed by peripheral berms 76 and linings 74, it is periodically pumped over an adjacent, interior berm 78 into an adjacent covered cell with a small portable sump pump 80, where it is then discharged from the system via this cell's drainage system 82; and (8) in cold wintertime climates, the top of a cell that is being loaded is left uncovered prior to snow storms so that the covers are not covered with snow (however, the heat given off by the damp underlying refuse undergoing biodegradation may melt a snow blanket).

Figure 3:
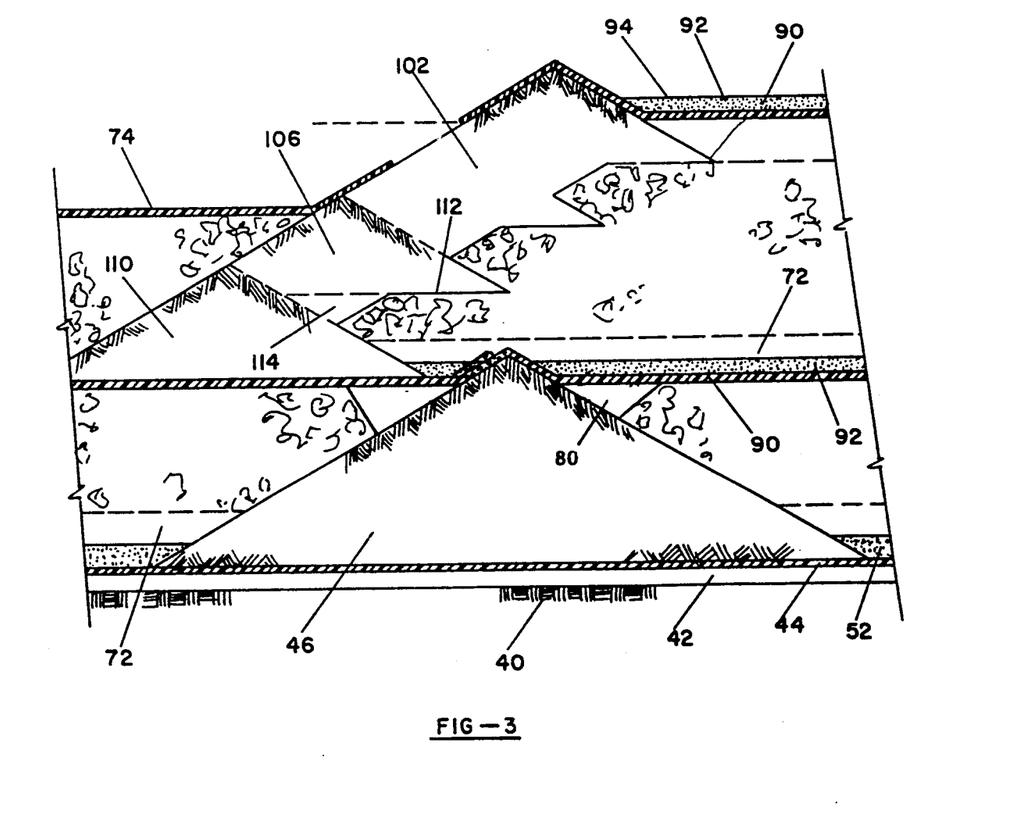
FIG. 3 is an enlarged vertical cross-sectional view of the interior cell wall design and construction and the layering within cells of the FIG. 1 embodiment taken along line A of FIG. 2.
Figure 4:
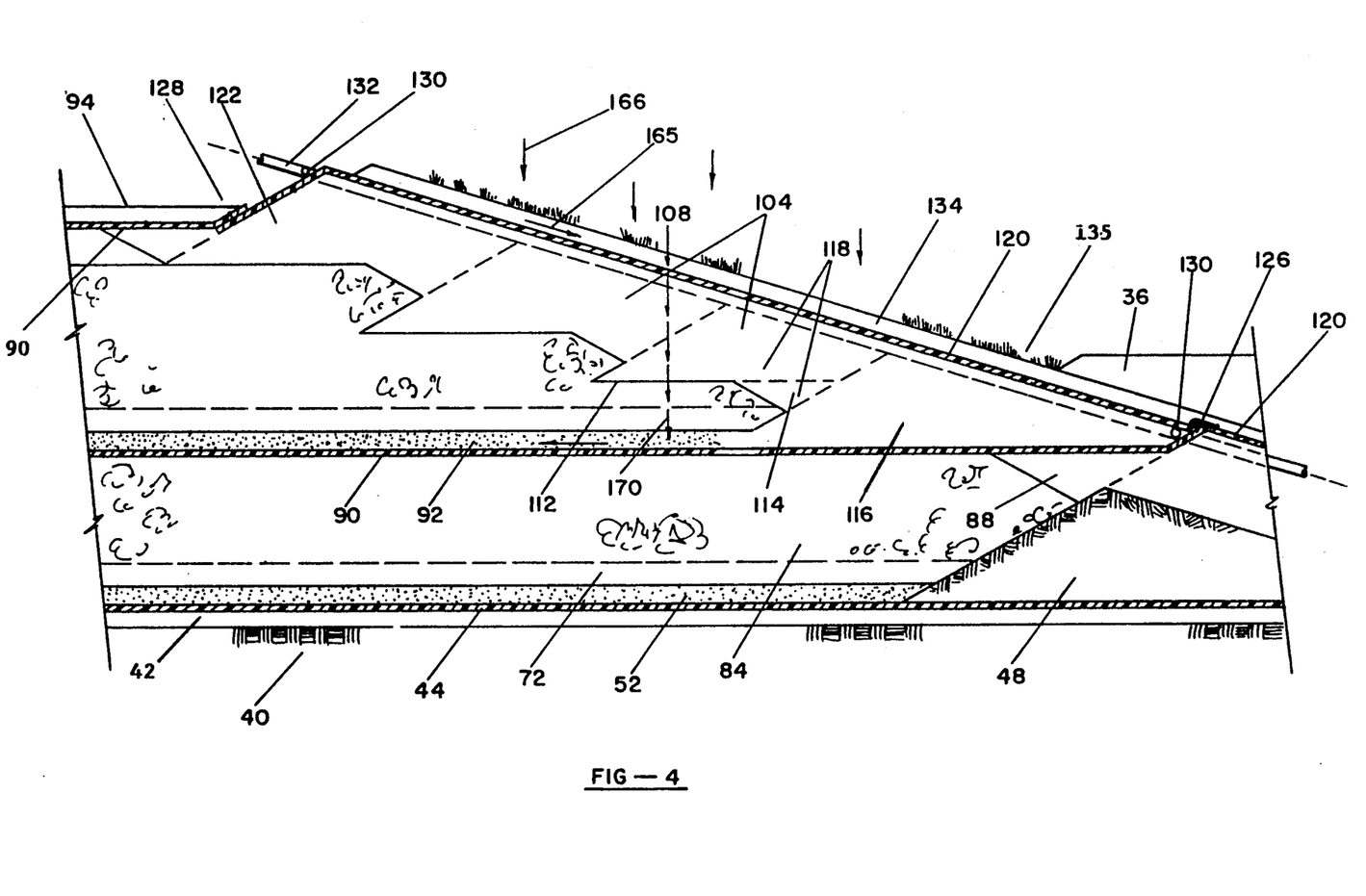
FIG. 4 is an enlarged vertical cross-sectional view of the FIG. 1 embodiment of the exterior cell wall design and the exterior surface taken along line B of FIG. 2.
Figure 5:
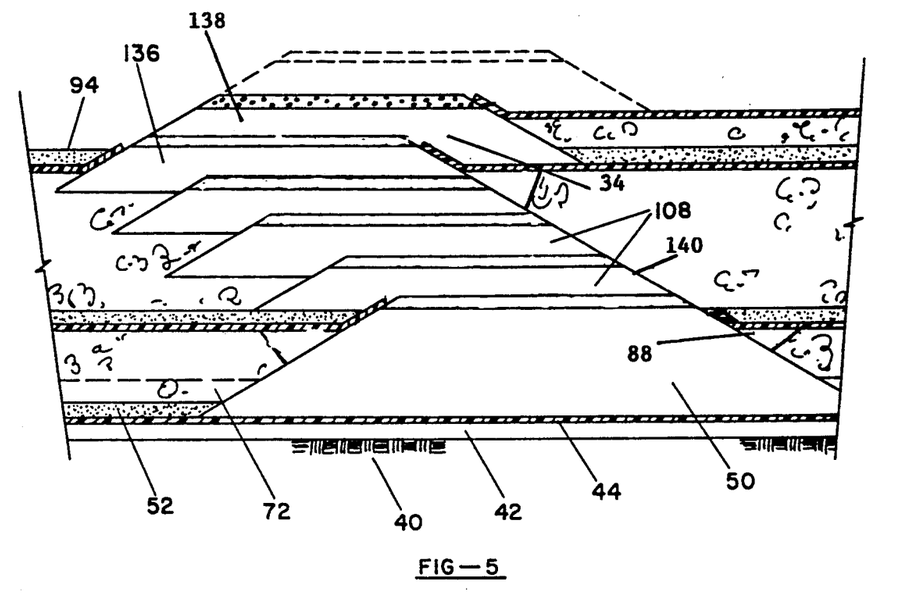
FIG. 5 is an enlarged vertical cross-sectional view of the FIG. 1 embodiment showing the center access road design taken along line 5—5 of FIG. 1.

As shown in FIGS. 4-6, as the refuse layers 84 are laid down in this cell, layers 86 of pea gravel (or other porous rock materials) are preferably incrementally built around pipes 62,64 to form a porous zone around these pipes and, when the refuse bed is about twelve to twenty inches from its final top location, a wide (approximately eight to ten feet) layer 87 of impervious clay is laid down to form a sealant layer around pipes 62,64. Layer 87 is designed to move down with bed settling without allowing leakage around the pipes. Also, as is shown in FIGS. 3-5, a "V" shaped ditch 88 is left open next to berms 46,48,50. These ditches are filled in with clay to provide a sealant layer at the ends of the overlying lining 90.

The bottom lining 90 (such as a 20 mil thickness of polyvinyl chloride, chlorinated polyethylene, high density polyethylene, or other suitable material) of the next overlying cell and its bottom sand layer 92 (approximately six to twelve inches in thickness) or temporary lining 41 are then formed on top of the leveled refuse to form a rain catchment basin 94 with peripheral berms (the tops of berms 46,48,50 or incremental berms 110,116,108) that are approximately twelve to sixty inches above sand layer 92. In the two to four years that will lapse before this overlying cell is fully formed and filled, the bed in the underlying cell will settle to some degree and catchment basin 94 will become deeper.

If desired, the cell is covered with a temporary lining. Such may be the case when the top cells are subjected to static biodegradation or when interlayers 90 and 92 are omitted. This lining 41 consists of heavier sheets (such as 40 mil chlorinated polyethylene or high-density polyethylene) of lining that are not bonded (a temporary sealant might be used) to one another, and are overlapped a few feet at their edges. No sand layer 92 is used in this instance.

The top portion of the perforated pipe as shown in FIG. 6 is fitted with a non-perforated section 96 with a gas withdrawal line 98 (this line may connect with a vacuum pump 99) at its top and the smaller standpipe 64 is fitted with a screen section 100 that extends several inches below the level of lining 90. A layer 86 of pea gravel (or other suitable porous rock material) is placed around this screen 100 to provide a free-flowing zone for the rain waters flowing into it.

With the first bottom cell now fully formed, filled, and covered with the bottom drainage zone of an overlying cell (with either a permanent or temporary cover), additional adjacent bottom cells can be constructed, filled, and covered in a like manner on either the interior wall side of the first cell or on the opposite side of the access road. When all of the cells in the bottom layer are formed, a new overlying layer of cells can be started above the first bottom cell, or in the cell on the opposite side of the access road from it.

Preferably, the bottom layer of the landfill is built with heavier wall berms 46,48,50 and is thinner than overlying cell layers because it forms a base for the rest of the landfill and it needs to be extra thick to resist base erosion by external flood waters.

Before filling is started in an overlying cell, the nonperforated top section 96 of vertical standpipe 96 is removed and replaced with another section of perforated pipe 62. Section 96 is then attached to its top again. Likewise, the small vertical standpipe 64 must have its screen section 100 removed, a section of non-perforated pipe 64 installed in its place and the screen reinstalled at its top. These extensions are necessary to convert the cell's impermeable bottom liner 90 and sand layer 92 from a rain catchment basin to an overlying cell bottom.

The interior and exterior walls 102,104,108 of all overlying cells are constructed in a different manner than the bottom cells. Since the overlying cells do not require the heavy features of the base layer cells, they can be built with greater depths. The large dirt berm walls 46,48,50 that are used in the bottom layer cells would require too much fill dirt and clay if they were used in the thicker overlying cells and they would occupy too much cell volume.

Preferably, interior cell walls 102 are constructed in a series of small (three to six feet high) triangular dirt berm 106 construction and refuse-filling steps. As is shown in FIGS. 3 and 4, concurrently with the building of the exterior walls 104 and the center access road 34, berm 110 is advantageously formed on top of lining 90 in an adjacent filled cell, and then filled with horizontal layers of refuse until level 112 is reached. A "V" shaped trench 114 is left next to berm 110 and a second berm 106 is formed in trench 114 and on top of level 112 while working from level 112. These filling and berm construction steps are repeated until the final height of berm 102 is reached (approximately ten to fifteen feet).

Preferably, the exterior walls of cells in overlying layers are built in a similar manner as the interior walls, except that they are constructed with an impermeable clay or other suitable material. An impervious lining is laid on their exterior surface and a rain drainage and cover layer is laid on top of this impervious layer. As is shown in FIG. 4, triangular compacted clay berm 116, having the desired side slope (1 to 3 in this instance) is formed on top of liner 90 near the exterior of the landfill with a height the same as berms 108 and 110, the interior of the cell is filled with refuse to level 112, and then, while working from the top of the refuse at level 112, berm 118 is next formed. This series of filling and berm-building steps is repeated until, like the interior wall, this wall reaches its ultimate height. An impervious liner 120 (such as a 40 mil thickness of polyvinyl chloride, chlorinated polyethylene or high-density polyethylene sheeting, or other suitable material) is next placed over the top incremental berm 122, down the side of the landfill and is then glued or bonded to lining section 124 at point 126. Lining 41 or 90 is laid on top of lining 120 at point 128, but not glued or bonded.

The side rain drainage system, as shown in FIGS. 1 and 4, which is extended upward with exterior wall construction, consists of a series of parallel perforated pipes 130 that are connected into perpendicular non-perforated main drainage pipes 132 that drain into concrete channel 38. This system lies on top of liner 120 and is covered over by a layer 134 of porous, fertile soil that is approximately twelve to twenty-four inches in thickness. The side ramps 36 of the center access road 34 (and 37 for a future road) are formed at a maximum grade of approximately ten percent on top of this layer 134. Grass or other vegetative cover 135 is planted on top of this layer 134 to prevent erosion and provide an aesthetic cover to the exterior of the landfill.

Preferably, the center access road 34, as shown in FIG. 5, is formed at the back end of an overlying cell and comprises short, offset trapezoidal berms 136 and 140 of compacted dirt constructed concurrently with the incremental cell filling steps and the incremental interior and exterior berm-building steps. Since the slanted exterior sides 138 of these back walls is formed on the side where a cell is yet to be constructed and filled, the order of cell building (on which side of the access road the next cell or half-layer will be built) determines which direction the incremental road berms will go. Hence, by alternating the construction of cells on opposite sides of the center road, the center access road will follow a zig-zag path 138,140 and stay roughly in the center of the landfill. If it is desired that the access road shift in one direction within the landfill, as may be the case in high landfills where a shift would give more length to the side ramps, then all the cells on the side 32 of the access road 34 that are on the opposite side from ramps 36 would first be constructed and filled, and then the row of cells on the other side 144 of the access road would be constructed and filled. This pattern would be repeated in subsequent overlying cells.

Figure 8:
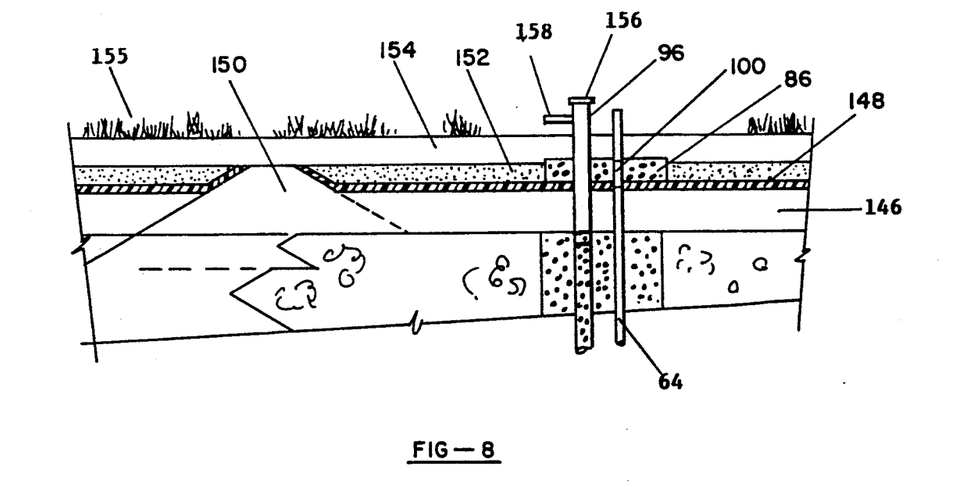
FIG. 8 is an enlarged vertical cross-sectional view of the FIG. 1 embodiment of the top surface design when it is completely filled and closed, as taken along line D of FIG. 2.

When the landfill is completed to its maximum economic height, it is preferably capped with the layers shown in FIG. 8. This cap comprises a thick (between two and six feet in thickness) layer 146 of impermeable clay or other suitable material that is formed on top of the refuse in the top layer of the landfill, a top lining 148 (such as a 40 mil (0.040 inch) thickness of polyvinyl chloride, chlorinated polyethylene or high density polyethylene sheeting, or other suitable material) is advantageously placed on top of it and lapped over the top of the incremental interior 150 and exterior (not shown) top berms. A sand layer 152, approximately one foot thick, is then formed on top of lining 148 and a porous, fertile soil layer 154 is formed on top of this sand layer. Grass or other vegetative cover 155 is planted on the top surface of layer 154. The top portion of the large vertical standpipe 96 is capped with a removable cap 156 and vented to a gas collection system 158 (not fully shown) that would deliver all of the effluent gases collected by the landfill system to a burner (not shown) or other system that would utilize these gases. The top portion of the small vertical standpipe 64 comprises a screen section 100 installed and surrounded by a pea gravel bed 86. This cap layer drains excess rain waters from the top cells on a cell-by-cell basis and provides a thick, impermeable top to the landfill.

Figure 9:
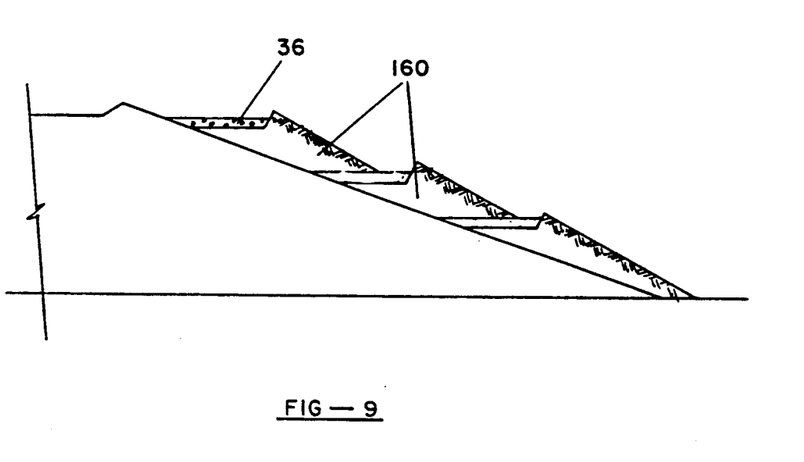
FIG. 9 is an enlarged vertical cross-sectional view of the FIG. 1 embodiment of the side ramp taken along line 9—9 of FIG. 1.

Side ramp roads 36, shown in FIGS. 1 and 9, are built as a series of berms 160 on the side of the landfill. Their grade is preferably less than approximately ten percent. If their length is too short to achieve this grade, they can be extended by building them around the corner of the landfill 37, as shown in FIG. 1. As previously mentioned, inclining the center roads will also give them more length.

All roads can be covered with a layer of gravel, as shown in FIGS. 5 and 9.

Figure 10:
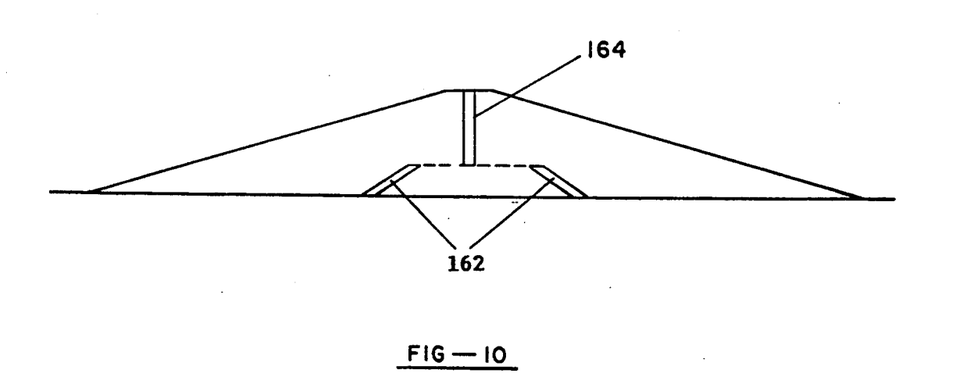
FIG. 10 is a vertical cross-sectional view of the FIG. 1 embodiment taken along lines 10—10 of FIG. 1.

Very large structures of the present invention will require more than one center access road if their cell lengths are to be kept within reasonable limits (for example, a maximum length of 1000 feet) and their maximum economic heights are to be reached. As is shown in FIG. 10, one preferred method of constructing these center access roads is to incline the two bottom roads 162 inward until the landfill is about one-half of its ultimate height. Thereafter only one vertical access road 164 is constructed in the center of the structure until it reaches its maximum economic height. This construction feature keeps the cells at near-uniform lengths throughout the landfill.

The order in which cells are built, filled, and covered in the top layer will, as previously discussed, be determined by which direction is selected for the center access road to develop as the landfill progresses in height. Another factor, however, is that covered cells should be given a reasonable period of time in which to settle before a new cell is built on top of them.

The appropriate number, size, and depth of cells in the landfill will need to be designed based on many factors, for example, the expected life of the landfill at a design tonnage rate, the settled bulk density of the compacted solid wastes, the loaded and settled depth of cells, climatic conditions that may dictate the amount of exposed loading cell areas that can be tolerated without allowing too much rain to enter the system, cost considerations, and the like. In general, however, cells must be large enough to accommodate loading and construction operations. Cell merging can be done when the cells become too small, as a result of inclination of the exterior walls, or more than one cell can be used for loading and construction. Cell merging is accomplished by removing an interior wall between two adjacent cells.

It is preferred that the height of the cells be limited to a height such that cell walls will not incur structural weaknesses or make the center access road too steep for truck traffic. On the other hand, cell walls must be high enough to minimize construction costs.

It is also preferred that the slope of the landfill's exterior side surfaces be at a sufficiently low angle such that the structural integrity of the overall landfill is not compromised, construction of the exterior walls or the exterior rain drainage system is hampered, or erosion aided. Such slope should be steep enough to minimize construction costs and maximize landfill volume.

The maximum height to which the landfill is built is preferably that height at which the top surface area becomes too small to economically or effectively deposit refuse or other solid wastes in it.

Preferably, the material used to form the exterior cell walls 104 (e.g., clay, clay-bentonite mixture, dirt-bentonite mixture, and the like) must have a very low coefficient of permeability. This layer, and the overlying layers 120 and 134, protect the interior of the landfill from rain infiltration. In the event of a rupture in the overlying plastic sheeting liner 120, this layer 104 should be flexible enough, thick enough, and impermeable enough to still protect the landfill's contents.

Landfill settlement over a long period of time will probably cause the impervious sheeting 90 on the bottoms of cells deep in the landfill to sag, and perhaps, rupture. This may cause leakage that may drain out of cells other than that in which the leak occurred. Top layers of the landfill would not be subject to such leakage.

The capability of the system to monitor leaks in the sidewalls and the top covered cells is an important feature of the present invention. If, as is shown in FIG. 4, rain water 166 (shown by arrows) avoids the side rain drainage system 130,132, penetrates via a rupture 108 (shown by arrows) in the plastic lining 120, and the four to six foot thick impermeable clay layer 104, it would percolate through a short distance (a few feet) of solid wastes 170, enter sand layer 92, and drain out of the system via vertical drainage pipe 62. Valved 172 drainage pipe 54 and reservoir 61 (see FIG. 7) would have water in it, evidencing a leak in a cell wall in the overlying cell column. Large vertical standpipe 62 of this cell column could then be examined internally by lowering instruments into it to determine which cell is producing leakage. This would indicate which general area of the landfill exterior surface is leaking. Also, leakage would probably cause some biodegradation and settling in the vicinity of the leak that would serve as evidence as to location. The soil layer 134 would then be removed from the leak area and a new synthetic lining 120 provided.

The likelihood of water getting through the exterior shell and into reservoir 61, however, is remote. Small amounts of water would be absorbed by the refuse and evaporated by biodegradation reactions. In the event of large amounts of water leaking through a rupture in the top covers 41 or 90, such water would percolate downward to the first impermeable lining 90 and then out of the system via sand layer 92 and the cell column's vertical drainage pipe 62. Again, the water would be noticeable in pipe 54 and the top linings could then be repaired.

The vertical drainage pipes 64 and the concrete trench 38 should be large enough to drain the rain from the covered cells at a precipitation rate of at least one inch per hour.

The amount of gas produced by the system in covered refuse cells is very slight. This is due to the fact that the moisture retained in the refuse is consumed by aerobic biodegradation (the gases are almost entirely carbon dioxide) while the cell is being filled. Little moisture is available for biodegradation in the covered cells.

It does not affect the system to have some water present in the refuse as it is being loaded and compacted in the cell. Some water might be added to the new refuse layers by means of a water truck to keep the dust and wind-blown papers down and to aid in compaction.

The construction and filling of one cell at a time in the present invention significantly reduces capital costs. Only one relatively small cell needs to be built before filling can begin. In the prior art, a large portion of the large bottom layer needs to be built before filling can begin. Also, these systems often also require that their leachate reservoirs and treatment facilities be ready for use as soon as filling begins.

The time that it takes to fill a cell in the present invention may vary from a few days, when solid wastes like old mill tailings are being rapidly loaded into the system, to several months when municipal refuse is being loaded at a relatively slow rate. Loading rates should not have much influence on cell dimensions, provided there is enough room on the top of the cell to effectively carry out the loading and cell wall construction steps.

It is better to have a base area that is rectangular rather than square in the present invention. A rectangular configuration gives shorter cell lengths with a given number of center access roads. On the other hand, a square base area provides a higher structure.

The present invention can be built on a sloping ground surface, as well as on a horizontal surface. In the sloping embodiment (not shown), however, it is necessary to have a drainage pipe similar to 62 located at the low end of the first layer to remove liquids that might collect in the bottom layer.

Better compaction may be achieved in the present invention by compacting refuse in relatively thin horizontal layers. This mode of compaction provides a hard level surface against which an overlying thin layer is compacted. In prior art technologies, the refuse is compacted in relatively thick (approximately one to four feet) layers on the diagonal face of the moving refuse berm.

Also, the present invention provides a much better covering on the compacted refuse than the present one foot thick daily layer of dirt that is used in the prior art. Cells that are permanently covered to prevent rain infiltration have a synthetic lining on top that is impervious, and a sand layer on top of such linings. Cells that are being loaded or undergoing biodegradation also are covered with heavy synthetic linings at almost all times (they may be open at times prior to a snowstorm and small sections are open during the loading or biodegradation wetting operations). Experiments on refuse in a one-and-one-half cubic yard trench have shown that a synthetic lining top cover reduces insect infestation and gas emission from buried refuse. The present invention generates very few obnoxious gases, and all gases that are generated are separately recovered. There are no gas emission problems.

The top porous, fertile dirt layers on the sides and the closure top of the present invention also absorb rain water and, together with the underlying synthetic liner and the rain drainage systems, act to remove excess rain water from these surfaces without erosion and hold water until it can be evaporated or consumed by the grass.

The dry nature of the process in the present invention eliminates differential settling caused by biodegradation. This is a major cause of cap rupture in the prior art.

The present invention can also be used as a dry repository for refuse bales. By stacking them on their sides, relatively thin horizontal layers are built within the cells.

The present invention can also dispose of wet materials such as manure, septic tank pumpings, sewage sludge, solubilized hazardous and non-hazardous chemicals, soluble salts, encapsulated medical and low-level radioactive wastes, encapsulated asbestos, and the like, by mixing them with solid waste within and outside of the landfill, such as municipal refuse, tailings, or contaminated or non-contaminated soils. Preferably, these wastes are disposed of deep within the landfill structure near access roads and closer to the tops of cells than the bottoms to further reduce any risks from long-term side leakage.

It should be understood that the present invention may be advantageously used with solid wastes that are mineral or soil-like in nature, as well as the previously discussed municipal refuse-type wastes. Examples of these solid wastes are old or newly-milled ore tailings that contain contaminants such as pyrites (a source of acids and ferric sulfates) and heavy metal minerals; soils that are contaminated with organic or inorganic chemicals (i.e., insecticides, hazardous industrial chemicals, PCB's, gasoline, lead dusts, and the like); beach sands and/or gravels that have become contaminated by an oil spill, and the like.

In another embodiment of the present invention, solids are loaded into the cells in slurry form (for example, mill tailings) and dewatered within the cells prior to their permanent deposition. In this embodiment, two or more cells undergo loading, construction, or dewatering at any given time. The bottom drainage zone (layers 90 and 92) and the large vertical pipe 62 serve to remove water that has percolated down through the waste solid bed. Sump pump(s) (not shown) remove clear water from the top of the cell and discharge it into an adjacent covered cell. Periodically, it is necessary to allow a cell that was being loaded to dry out on top so that the incremental wall berms can be constructed. This embodiment simplifies transportation of solids to the landfill and eliminates the need for final thickeners and tailing ponds at ore mills.

In yet another embodiment of the present invention, one or more of the newly-filled cells in the top layer of the landfill is kept in a wetted state for a period of time to cause accelerated biodegradation and the production of methane gas. Preferably, this process consists of adding enough lime (between one and twenty pounds per ton of refuse) to the refuse when it was loaded into the cells and then adding enough water via a sprinkler 101, or recirculated leachates, to the refuse bed to keep it at a moisture content between forty and seventy weight percent for a period of between three and thirty-six months. Water is best added by rain influx (see FIG. 1 for an exposed cell 43) or by sprinkling 101 the surface of the exposed refuse. Preferably water, or recirculated leachates, are added on a periodic basis until it drains out the bottom of the cells. At this point, the top of the refuse bed is covered over by temporary liner 41 and weighted down or temporarily sealed with a sealant around the edges to prevent wind-blowage and leakage. The overlying sand layer 92 is not placed on top of a replacement liner 90 until the underlying refuse bed had been totally biodegraded to its economic limit. Liner 41 preferably comprises chlorinated polyethylene or high-density polyethylene to resist deterioration by sunlight. Liner 41 is also periodically rolled back to allow the refuse bed wetting. To prevent gas leakage to the atmosphere, vacuum pump 99 is used on those cells that are undergoing accelerated biodegradation to produce a negative pressure there within. Such pumping is not necessary for cells that are permanently covered as they are under a positive pressure. Berms 103 and sump pump 80 drain rainwater from isolated covered areas or ponded areas that result from differential bed settlement.

When water and lime are added to refuse in a cell, aerobic and anaerobic biodegradation occurs and produces various gases (principally methane, carbon dioxide, and hydrogen sulfide). Some autogenous cleansing of methane is accomplished by the solubilization of carbon dioxide and hydrogen sulfide gases and their precipitation by heavy metal, calcium, and magnesium ions in the interstitial leachates to insoluble calcium and magnesium carbonates and heavy metal sulfides. The cleansed methane migrates through the porous refuse to large, perforated pipe 62 under a negative pressure (top cells undergoing accelerated biodegradation) or a positive pressure (underlying cells), and out of the system via the gas collection system 98. If the refuse is not porous enough, it may be necessary to use a porous pipe grid (similar to 130 and 132) on top of the refuse to reduce gas flow friction within the refuse bed. The interstitial leachates, if given enough time, together with the proper degree of refuse bed wetting, eventually become environmentally inert and no longer contain significant amounts of pollutant contaminants. The methane is contained within the cell and caused to migrate off because of temporary cover 41 or permanent cover 90 and 92.

This embodiment of the present invention produces large quantities of cleansed methane gas that can be used as fuel. Also, if carried to the point where the refuse is rendered environmentally inert, the system is given an added degree of environmental security.

In yet another embodiment of the present invention, partial biodegradation is achieved by wetting the dry refuse in the cells refuse bed prior to covering it with layers 90 and 92.

In another embodiment, the invention is used as a means of remedial action and to add new capacity to existing landfills by constructing side covers 104,120,130,132,134,135 on the exterior sides of the existing landfill and the cellular landfill structure 30 on its horizontal top surface. The top dirt layer of this landfill serves as layer 40 and liner 44 and layer 52 can be omitted. Pipes 54,56 exit the landfill at its original top surface.

EXAMPLES (INDUSTRIAL APPLICABILITY)

The invention is further illustrated by the following non-limiting examples.

EXAMPLE 1

This example, as described in TABLE 1, consists of a hypothetical, modern, sanitary landfill that is similar to one that was built in Delaware in 1983. It is included herein as a comparative example for EXAMPLES 2 and 3.

This landfill utilizes a design wherein 24-acre, above-ground, relatively thin (31.5 feet, with 20 feet of refuse) individual landfills, or cells, are formed with a three foot thick clay, sand, and top soil cap and a 3.5 foot thick clay, sand, and dirt bottom. The bottom of each cell also has two 30-mil polyvinyl chloride synthetic linings, a leak detection zone, and a leachate drainage system in its base. About five feet of its height is filled with dirt fill that is used as a daily covering. Each cell is constructed, filled, and covered with the cap before filling is started on another cell, in order to minimize leachate production. Although this landfill minimizes leachate production, it still requires leachate storage reservoirs and treatment facilities.

EXAMPLE 2

A landfill system constructed and filled with municipal refuse in accordance with the foregoing description of the present invention, and the design data that are presented in TABLE 1, serves a population of 100,000 for 30 years. Sixteen cells are formed in the first layer, each with rectangular dimensions that are approximately 900 feet×325 feet. The average depth of the overlying cell layers is each assumed to be twelve feet when the refuse fill is settled. With this cell volume, and a loading rate of 550 tons per day, it requires approximately three months to fill each cell in the second layer of the landfill. Less time is required to fill overlying cells as they grow smaller.

TABLE 1 further describes the design and construction of this landfill, the amounts of the individual natural building materials, the synthetic linings that are used, and the system's estimated capital, direct operating, and long-term environmental costs.

When these data are compared with EXAMPLE 1, which describes a modern sanitary landfill of the same capacity, it can clearly be seen that the present invention is superior in virtually every respect. The present invention has 24 percent less volume, it uses only about 34.6 percent of the natural building materials, needs only 18.1 percent of the land area, has 16.3 percent of the capital costs, less than 55 percent of the direct operating costs, and much lower long-term environmental costs than the landfill described in EXAMPLE 1.

EXAMPLE 3

Again, in this example, a landfill is constructed and filled with municipal refuse in the manner of the foregoing description and the design data presented in TABLE 1. In this case, however, it is designed for a population of 30,000 for 30 years instead of a population of 100,000 for 30 years. Sixteen cells are used in the first layer that have dimensions of approximately 500 feet×200 feet, and the settled thicknesses of the cells in overlying layers is assumed to be twelve feet.

It is important that the present invention's costs be relatively low when it is used for small facilities. Many small municipalities and rural areas need their own landfill, but cannot afford the high costs that are associated with those of the present technologies or the high transportation costs incurred when they transport their refuse to larger landfills.

As the data of TABLE 1 describe, a relatively small (30,000 population) facility of the present invention would have proportional capital, direct operating, and long-term environmental costs that are not much higher than those of the present invention facility that is designed for a population of 100,000.

Much larger landfills of the present invention can also be built. One that would be designed for a population of 1,000,000 for a life of 30 years would cover an area of about 534 acres, ultimately reach a height of over 400 feet, and would have lower costs than the facility described in EXAMPLE 2.

EXAMPLE 4

In this example, the present invention is used as a repository for contaminated mineral or soil-like materials (e.g., old or newly-milled ore tailings (with or without residual radioactive minerals), soils contaminated with organic or inorganic chemicals, petroleum-contaminated beach sands, gravels, and the like) that, although they may be damp, do not contain enough moisture to require in-landfill dewatering or drainage.

A few changes prove to be advantageous in the design and use of the present invention, as heretofore described, for this type of fill. First, since these materials do not require in-landfill drainage or gas recovering, it may save costs to eliminate some of the interliners 90 and their overlying sand layers 92 so that two or more cell layers are grouped together to form thicker (24 or 36 foot thick) solid waste layers. Since these twelve foot layers are exposed to rain infiltration without their customary cell bottom covers, it is necessary to use temporary synthetic linings 41 on top of the filled cells. Also, if the fill material is suitable, it can be used in the place of fill dirt to construct the system's center access road and the interior berms. This reduces the fill dirt and sand requirements and increases the capacity of a landfill of a given size.

The big savings in costs, however, over those experienced when the system is used as a repository for municipal refuse, result from the higher bulk density of these types of fills (approximately 2455 pounds per cubic yard compared to only 800 pounds per cubic yard for refuse). Thus, many more tons of soil-like materials and minerals can be stored in a landfill of a given size than refuse. For example, if the fill material is used to build the center road and the interior berms, a landfill of the size described in EXAMPLE 3 is able to contain approximately 6 million tons (in terms of dry weight) of these materials, as compared to 1.26 million tons of municipal refuse. Direct operating costs are less because of the reduced use of synthetic linings, the reduced use of fill dirt and sand, the increased bulk densities, and the lower filling costs. They are in the range of $1.50 to $2.50 per ton in a landfill of the present invention that is of the size described in EXAMPLE 3. Capital costs are also less because of the lower land costs in the areas where these types of wastes occur, and the wastes themselves might be used to construct portions of the initial cell. Long-term environmental costs are low in virtually any geographic location.

EXAMPLE 5

In this example, the present invention is used to permanently dispose of the same types of mineral wastes that are described in EXAMPLE 4, except that they are partially or completely saturated with fluids. Examples where this is the case are old tailings that have been saturated by rain waters in ponds or that have just been milled and are still in slurry form.

In these cases the heretofore described invention requires few changes to dewater these solids and dispose of them within the system. If these fill materials are merely wet, but not slurried, the sand drainage layers 92 on the tops of the impervious interlayers 90 drain the excess waters from the fill in each of the individual cells, as they are loaded, to small treatment reservoir 61. If, however, the fill is in slurry form, then, as previously mentioned, it is necessary to decrease the depth of each cell and, in conjunction with the bottom drainage system, decant the clear water from the top of the cell with a sump pump.

Direct operating costs are slightly more in this example than in EXAMPLE 4; other costs are about the same.

EXAMPLE 6

In this example, in addition to its use as a municipal refuse repository, the present invention is used to environmentally treat the refuse and produce valuable methane gases.

It is assumed in this example that the same dry landfill that is described in EXAMPLE 2 is used to generate and recover methane gas. This is accomplished by: (1) adding approximately five pounds of lime per ton to the refuse in the loading step; (2) wetting the refuse bed of a newly-filled cell with rain water or sprinkling it until leachate starts to come out of the bottom of the cell (this leachate can be recirculated to get rid of it); (3) covering the top of the cell with overlapping sections of forty mil chlorinated polyethylene or high-density polyethylene lining 41; (4) to maintain the refuse bed's moisture content between forty and seventy weight percent, the top liner is periodically rolled back (see FIG. 1) and re-wet by rainwater, small amounts of recirculated leachate, or other added water until leachates again come out of the bottom of the cell; (5) if necessary, maintaining a negative pressure on the cell during its gas production cycle; when the gas production diminishes to a level that is no longer economic, the top of the refuse layer is releveled and lining 90 is permanently installed on top of the leveled and environmentally-treated refuse; and (6) sand layer 92 is placed on top of the lining 90. Methane gas is recovered throughout its production cycle and thereafter, as well.

It has been estimated that approximately 6630 cubic feet of methane gas can be produced from each ton of municipal refuse by biodegradation. If, for example, this amount of methane is produced in this system and its value is $1.60 per 1000 cubic feet (the approximate current value of pipeline quality methane gas at a wellhead), then $10.61 of gas is produced from each ton of refuse. The added bed volume that results from the settlement caused from biodegradation is worth another one to two dollars in landfill construction and operating costs. However, the costs of the water pumping, the lime addition, and the extra gas handling must be deducted from these gas incomes to determine the overall costs of this process.

TABLE 1

| Estimated Design and Cost Data for a Modern Sanitary Landfill and Dry Landfills | | | |
|---|---|---|---|
| | EXAMPLE 1 | EXAMPLE 2 | EXAMPLE 3 |
| DESIGN DATA | | | |
| Landfill Type | Modern Sanitary | Dry Lanfill | Dry Lanfill |
| Fill Type | Municipal Refuse | Municipal Refuse | Municipal Refuse |
| Climatic Conditions | Wet, Eastern U.S. | Wet, Eastern U.S. | Wet, Eastern U.S. |
| Population Served | 100,000 | 100,000 | 30,000 |
| Landfill Life, years | 30 | 30 | 30 |
| Average Daily Tonnage | 550 | 550 | 165 |
| Compacted Refuse Density, #/yd³ | 800 | 800 | 800 |
| Total Refuse in Landfill, tons | 6,100,000 | 6,100,000 | 1,260,000 |
| Total Refuse Volume, yd³ | 15,000,000 | 15,000,000 | 4,500,000 |
| Landfill Base Dimensions, ft × ft | NA | 2634 × 1850 | 1050 × 1608 |
| Landfill Base Area, Acres | 620 | 112 | 39 |
| Side Slope Steepness, run/rise | 3/1 | 3/1 | 3/1 |

TABLE 1-continued

Estimated Design and Cost Data for a Modern Sanitary Landfill and Dry Landfills

| | EXAMPLE 1 | EXAMPLE 2 | EXAMPLE 3 |
|---|---|---|---|
| Ultimate Landfill Height, ft. | 31.5 | 267 | 134 |
| Ultimate Top Area, Acres | 250 | 5 | 3.2 |
| Clay Usage Volume, yds$^3$ | 1,700,000 | 1,000,000 | 390,000 |
| Porous Soil Usage, yds$^3$ | 750,000 | 193,000 | 60,000 |
| Sand Usage, yds$^3$ | 2,000,000 | 720,000 | 380,000 |
| Fill Dirt Usage, yds$^3$ | 4,125,000 | 1,070,000 | 430,000 |
| Total Usage of Above Materials, yds$^3$ | 8,620,000 | 2,983,000 | 1,260,000 |
| Total Landfill Volume, yds$^3$ | 23,620,000 | 17,983,000 | 5,760,000 |
| Total 40 mil HDPE Used, yds$^2$ | 2,904,000* | 1,180,000 | 405,800 |
| Total 20 mil HDPE Used, yds$^2$ | none | 2,376,000 | 747,000 |
| Leachate Reservoir Area, Acres | 25 | none | none |
| CAPITAL COSTS (Landfill and Leachate Facilities Only) | | | |
| Land Acquisition @ $10,000/Acre | 6,950,000 | 1,620,000 | 564,000 |
| Initial Cell Construction, $ | 2,000,000 | 330,000 | 120,000 |
| Initial Leachate | 1,500,000 | 0 | 0 |
| Leachate Treatment Facilities, $ | 1,550,000 | 0 | 0 |
| Total Capital Costs, $** | 12,000,000 | 1,950,000 | 684,000 |
| DIRECT LANDFILL OPERATING COSTS | | | |
| Natural Construction Materials (inst.), $/ton*** | 11.15 | 4.29 | 6.26 |
| Synthetic Linings, $/ton | 1.16 | 1.40 | 2.23 |
| Filling, etc. | 2,50 | 2.50 | 3.50 |
| Leachate Treatment, $/ton | Not Determined | 0 | 0 |
| Total | 14.81+ | 8.19 | 11.99 |
| LONG-TERM ENVIRONMENTAL COSTS | | | |
| Monitoring | moderate | low | low |
| Leachate Treatment | may be high | 0 | 0 |
| Maintenance and Repair | may be high | low | low |
| Remedial Action | may be high | 0 | 0 |

* A 30 mil thickness of polyvinyl chloride is used in this case.
** This does not include interest on these capital costs.
*** This assumes installed costs of clay @ $12.00/yd$^3$, porous soil @ $12.00/yd$^3$, sand @ $9.00/yd$^3$, fill dirt @ $5.00/yd$^3$, $0.25/ft$^2$ for 20 mil synthetic lining, $0.27/ft$^2$ for 30 mil synthetic lining, and $0.30/ft$^2$ for 40 mil synthetic lining.

The preceding examples can be repeated with similar success by substituting generically or specifically described reactants and operating conditions described above.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

What is claimed is:

1. A method of disposing of waste comprising the steps of:
   (a) providing an impermeable base at a predetermined landfill site;
   (b) constructing upon the impermeable base a plurality of berms and thereby defining in a cell-by-cell manner a plurality of conterminous waste-containing cells with common berms between adjacent waste-containing cells;
   (c) constructing an overlying plurality of berms and thereby defining in a cell-by-cell manner a plurality of conterminous waste-containing cells in overlying relationship to the waste-containing cells disposed on the impermeable base;
   (d) installing means for removing fluids from at least two levels in each waste-containing cell;
   (e) filling the waste-containing cells with waste;
   (f) providing in a cell-by-cell manner an impermeable cover for the waste-containing cells; and
   (g) providing in a cell-by-cell manner impermeable side coverings for the waste-containing cells.

2. The method of claim 1 wherein the step of providing an impermeable base comprises the steps of compacting the soil of the landfill site, providing an impervious clay layer over the compacted soil and providing an impermeable liner over the impervious clay layer.

3. The method of claim 1 wherein the step of providing an impermeable base comprises establishing the base over and around an existing landfill.

4. The method of claim 1 wherein the step of providing an impermeable base comprises establishing a horizontal base.

5. The method of claim 1 wherein the step of providing an impermeable base comprises establishing a sloped base.

6. The method of claim 1 wherein the steps of constructing berms comprises constructing berms that project above a top level of the waste-containing cells thereby providing top peripheral berms around the waste-containing cells.

7. The method of claim 1 wherein the steps of constructing a plurality of berms comprises the step of constructing a plurality of triangular-shaped berms.

8. The method of claim 1 wherein the steps of constructing a plurality of berms comprises the step of constructing a plurality of trapezoidal-shaped berms.

9. The method of claim 1 wherein the steps of constructing a plurality of berms comprises the step of providing impermeable walls.

10. The method of claim 1 wherein the step of providing an impermeable cover comprises the step of providing a temporary cover.

11. The method of claim 1 wherein the step of providing an impermeable cover comprises the step of providing a permanent cover.

12. The method of claim 1 wherein the step of providing an impermeable cover comprises the step of covering each filled waste-containing cell independently with an impermeable material.

13. The method of claim 1 wherein the step of installing means for removing fluid from the waste-containing cells further comprises the step of removing fluid from each waste-containing cell independent of the other waste-containing cells.

14. The method of claim 1 wherein the step of installing means for removing fluid from the cells further comprises the step of removing at least one member selected from the group consisting of rain water, snowmelt water, gases, leachate, and leakage.

15. The method of claim 1 wherein the step of installing means for removing fluids comprises the step of installing perforated and unperforated piping.

16. The method of claim 15 wherein the step of installing perforated piping comprises the step of installing vertical perforated piping.

17. The method of claim 1 wherein steps b) through e) are repeated, thereby resulting in a horizontal layer of filled waste-containing cells.

18. The method of claim 1 wherein steps c) through g) are repeated, thereby resulting in a multiplicity of overlying layers of filled waste-containing cells.

19. The method of claim 18 further comprising the step of separating the waste-containing cells in overlying layers from the waste-containing cells in underlying layers by an impermeable material.

20. The method of claim 1 further comprising the step of providing at least one access road.

21. The method of claim 20 further comprising the step of providing one or more access roads between waste-containing cells.

22. The method of claim 20 wherein the step of providing at least one access road comprises providing access roads on the sides of the landfill connecting with access roads that transect the landfill.

23. The method of claim 1 further comprising the step of providing a dry state in the waste-containing cells.

24. The method of claim 1 further comprising the step of providing biodegradation in the waste-containing cells.

25. The method of claim 24 wherein the step of providing biodegradation further comprises the step of temporarily covering the waste-containing cells during the biodegradation.

26. The method of claim 24 wherein the step of providing biodegradation in the waste-containing cells comprises the step of applying a physical process to the waste-containing cells.

27. The method of claim 26 wherein the step of applying a physical process to the waste-containing cells comprises at least one process selected from the group consisting of: applying a vacuum to the waste-containing cells; loading waste in piles in preselected active areas on a horizontal top surface of the waste-containing cells; covering waste-containing cells with netting; wet compacting of waste-containing cells; dry compacting of waste-containing cells; selective removal of hazardous wastes in thin horizontal layers within the waste-containing cells; periodic wetting of the waste-containing cells; selective withdrawal of gases from the waste-containing cells; and dewatering of slurried wastes in the waste-containing cells.

28. The method of claim 24 wherein the step of providing biodegradation in the waste-containing cells comprises the step of providing a chemical process in the waste-containing cell.

29. The method of claim 28 wherein the step of providing a chemical process in the waste-containing cells comprises at least one process selected from the group consisting of: biodegradation; gas production; leaching; dissolution; reprecipitation; and neutralization.

30. The method of claim 1 wherein the step of filling the waste-containing cells with waste comprises filling the cells with at least one type of waste selected from the group consisting of solid waste, liquid waste, slurried waste, ore tailings, industrial compounds, chemically-contaminated materials, radioactively-contaminated materials, municipal waste, beach sands, manure, septic tank pumpings, sewage sludge, petroleum products, salts, medical wastes, asbestos, and hazardous wastes.

31. The method of claim 1 further comprising the step of monitoring the waste-containing cells.

32. The method of claim 27 further comprising the step of providing a soil-vegetative layer over the impermeable cover.

33. The method of claim 1 wherein step d) comprises the step of filling one waste-containing cell at a time with waste.

34. The method of claim 1 wherein step d) further comprises the step of simultaneously constructing other waste-containing cells while filling a waste-containing cell with waste.

35. The method of claim 1 wherein step b) further comprises the step of constructing exterior and interior waste-containing cell walls on an incremental berm basis.

36. The method of claim 1 wherein step e) comprises the step of continuously and completely covering waste-containing cells during construction and filling of other waste-containing cells.

37. A system for disposing of waste comprising:
an impermeable base disposed at a predetermined landfill site;
a plurality of berms defining a plurality of conterminous waste-containing cells upon said impermeable base, with common berms between adjacent said waste-containing cells;
an overlying plurality of berms defining an overlying plurality of conterminous waste-containing cells;
means for removing fluids from at least two levels in said waste-containing cells; and
impermeable top and side covers for said waste-containing cells.

38. The system of claim 37 wherein said impermeable base comprises compacted soil of the landfill site, an impervious clay layer over said compacted soil, and an impermeable liner over said impervious clay layer.

39. The system of claim 37 wherein said impermeable base is disposed above an existing landfill.

40. The system of claim 37 wherein said impermeable base is horizontally disposed.

41. The system of claim 37 wherein said impermeable base is sloped.

42. The invention of claim 37 wherein said berms project above a top level of said waste-containing cells thereby providing top peripheral berms around said waste-containing cells.

43. The system of claim 37 wherein said plurality of berms comprises triangular-shaped berms.

44. The system of claim 37 wherein said plurality of berms comprises trapezoidal-shaped berms.

45. The system of claim 37 further comprising impermeable walls.

46. The system of claim 37 wherein said impermeable cover comprises a temporary cover.

47. The system of claim 37 wherein said impermeable cover comprises a permanent cover.

48. The system of claim 37 wherein each filled waste-containing cell comprises an independent impermeable material.

49. The system of claim 37 wherein said fluid removing means comprises means for removing fluid from each waste-containing cell independent of said other waste-containing cells.

50. The invention of claim 37 wherein said fluid removing means comprises means for removing at least one member selected from the group consisting of rain water, snowmelt water, gases, leachate, and leakage.

51. The system of claim 37 wherein said fluid removing means comprises perforated and unperforated piping.

52. The system of claim 45 wherein said perforated piping comprises vertical perforated piping.

53. The system of claim 37 wherein said plurality of waste-containing cells are disposed in a horizontal layer.

54. The system of claim 37 wherein said plurality of waste-containing cells are disposed in overlying layers.

55. The system of claim 48 further comprising an impermeable material between said overlying layers.

56. The system of claim 37 further comprising at least one access road.

57. The system of claim 50 comprising at least one access road between waste-containing cells.

58. The system of claim 50 comprising access roads on the sides of the landfill connecting with access roads that transect the landfill.

59. The system of claim 37 wherein said waste-containing cells are in a dry state.

60. The system of claim 37 wherein said waste-containing cells are biodegraded.

61. The system of claim 60 wherein said waste-containing cells are temporarily covered.

62. The system of claim 60 wherein said waste-containing cells are wetted.

63. The system of claim 37 wherein said waste-containing cells are filled with at least one type of waste selected from the group consisting of solid waste, liquid waste, ore tailings, industrial compounds, chemically-contaminated materials, radioactively-contaminated materials, municipal waste, beach sands, manure, septic tank pumpings, sewage sludge, petroleum products, salts, medical wastes, asbestos, and hazardous wastes.

64. The system of claim 37 further comprising means for monitoring said waste-containing cells.

65. The system of claim 37 further comprising a soil-vegetative layer over said impermeable cover.

* * * * *